United States Patent
Mishra et al.

(10) Patent No.: US 11,356,483 B2
(45) Date of Patent: Jun. 7, 2022

(54) PROTECTING NETWORK-BASED SERVICES USING DECEPTION IN A SEGMENTED NETWORK ENVIRONMENT

(71) Applicant: Illumio, Inc., Sunnyvale, CA (US)

(72) Inventors: Rupesh Kumar Mishra, Santa Clara, CA (US); Paul James Kirner, Palo Alto, CA (US); Rushabh Sanghvi, Milpitas, CA (US)

(73) Assignee: Illumio, Inc., Sunnyvale, CA (US)

( * ) Notice: Subject to any disclaimer, the term of this patent is extended or adjusted under 35 U.S.C. 154(b) by 399 days.

(21) Appl. No.: 16/683,127

(22) Filed: Nov. 13, 2019

(65) Prior Publication Data

US 2021/0144181 A1 May 13, 2021

(51) Int. Cl.
*H04L 9/40* (2022.01)
*H04L 43/062* (2022.01)

(52) U.S. Cl.
CPC ............ *H04L 63/20* (2013.01); *H04L 43/062* (2013.01); *H04L 63/0263* (2013.01); *H04L 63/1416* (2013.01); *H04L 63/1425* (2013.01); *H04L 63/1433* (2013.01); *H04L 63/1491* (2013.01)

(58) Field of Classification Search
None
See application file for complete search history.

(56) References Cited

U.S. PATENT DOCUMENTS

| | | | |
|---|---|---|---|
| 2016/0359905 A1* | 12/2016 | Touboul | G06F 21/56 |
| 2017/0093911 A1* | 3/2017 | Robertson | H04L 63/20 |
| 2017/0134422 A1* | 5/2017 | Shieh | H04L 63/1408 |
| 2017/0374032 A1* | 12/2017 | Woolward | H04L 63/0263 |
| 2018/0234459 A1* | 8/2018 | Kung | H04L 63/0263 |
| 2020/0177629 A1* | 6/2020 | Hooda | G06F 21/566 |

* cited by examiner

*Primary Examiner* — Joseph P Hirl
*Assistant Examiner* — Hassan Saadoun
(74) *Attorney, Agent, or Firm* — Fenwick & West LLP

(57) ABSTRACT

A policy management server manages a segmentation policy for segmenting a network and a deception policy for implementing deception services. The policy management server distributes segmentation rules and deception rules to distributed enforcement modules that configure respective traffic filters to enforce the policies. The deception rule may be enforced directly by the traffic filter acting as a deception service, or the traffic filter may act as a proxy to an external deception service. The deception service can behave similarly to a real service to obtain information about the malicious actor that is reported to the policy management server to enable the policy management server to take a remedial action. Furthermore, the policy management server may automatically generate the deception policy based on the segmentation policy such that connection requests that are not allowed by the segmentation policy are automatically sent to a deception service.

20 Claims, 5 Drawing Sheets

PROTECTING NETWORK-BASED SERVICES USING DECEPTION IN A SEGMENTED NETWORK ENVIRONMENT

BACKGROUND

Technical Field

This application relates generally to application security, and more specifically, to protecting applications in segmented network environment using deception.

Description of Related Art

A segmentation policy comprises a set of rules that control which workloads may communicate on a network and may place restrictions on how such workloads may communicate. To enforce the segmentation policy, distributed firewalls executing on hosts or network midpoint devices receive management instructions for enforcing respective rules of the segmentation policy. The firewalls filter traffic based on the respective IP addresses and ports of the source and destination to enforce the rules. The segmentation policy thus secures the network by placing restrictions on access to network-based services. Nevertheless, a malicious actor that avoids these access restrictions may still be able to exploit vulnerabilities before being detected.

SUMMARY

A system, non-transitory computer-readable storage medium, and method protects services in a segmented network environment using deception. In a first embodiment, a policy management server stores a segmentation rule that allows communications meeting first criteria between at least a first group of workloads and a second group of workloads. The policy management server furthermore stores a deception rule for implementing a deception service with respect to communications meeting second criteria. The policy management server distributes the segmentation rule and the deception rule to an enforcement module executing on a remote device and associated with at least one workload of the first group of workloads to cause the enforcement module to configure a traffic filter to allow the communications meeting the first criteria of the segmentation rule and to facilitate a deception service in response to communications meeting the second criteria of the deception rule. The policy management server receives from the workload, traffic flow data associated with communications meeting the second criteria of the deception rule. The policy management server detects if the traffic flow data is indicative of malicious behavior. The policy management server then performs a remedial action in response to detecting the traffic flow data is indicative of the malicious behavior.

In another embodiment, an enforcement module of a host device receives a segmentation rule for allowing communications meeting first criteria between a local workload associated with the enforcement module and one or more remote workloads. The enforcement module also receives a deception rule for implementing a deception service in association with communications that meet second criteria. The enforcement module configures a traffic filter of the host device to enforce the segmentation rule and the deception rule. The enforcement module receives a connection request that meets the second criteria of the deception rule. The traffic filter is applied to establish a connection responsive to the connection request and to facilitate a deception service with respect to the connection. Traffic flow data associated with the connection is monitored and sent to the policy management server.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

A policy management server manages a segmentation policy for segmenting a network and a deception policy for implementing deception services. The policy management server distributes segmentation rules and deception rules to distributed enforcement modules that configure respective traffic filters to enforce the policies. The deception rule may be enforced directly by the traffic filter acting as a deception service, or the traffic filter may act as a proxy to an external deception service. The deception services behave similarly to real services so that a malicious actor may unknowingly connect to a deception service instead of a real service. The deception service can then obtain information about the malicious actor that is reported to the policy management server to enable the policy management server to take a remedial action. Furthermore, the policy management server may automatically generate the deception policy based on the segmentation policy such that connection requests that are not allowed by the segmentation policy are automatically sent to a deception service. Beneficially, the described embodiments enable widespread deployment of deception services to provide a high likelihood of a malicious actor being discovered by a deception service prior to carrying out a successful attack.

Figure 1:
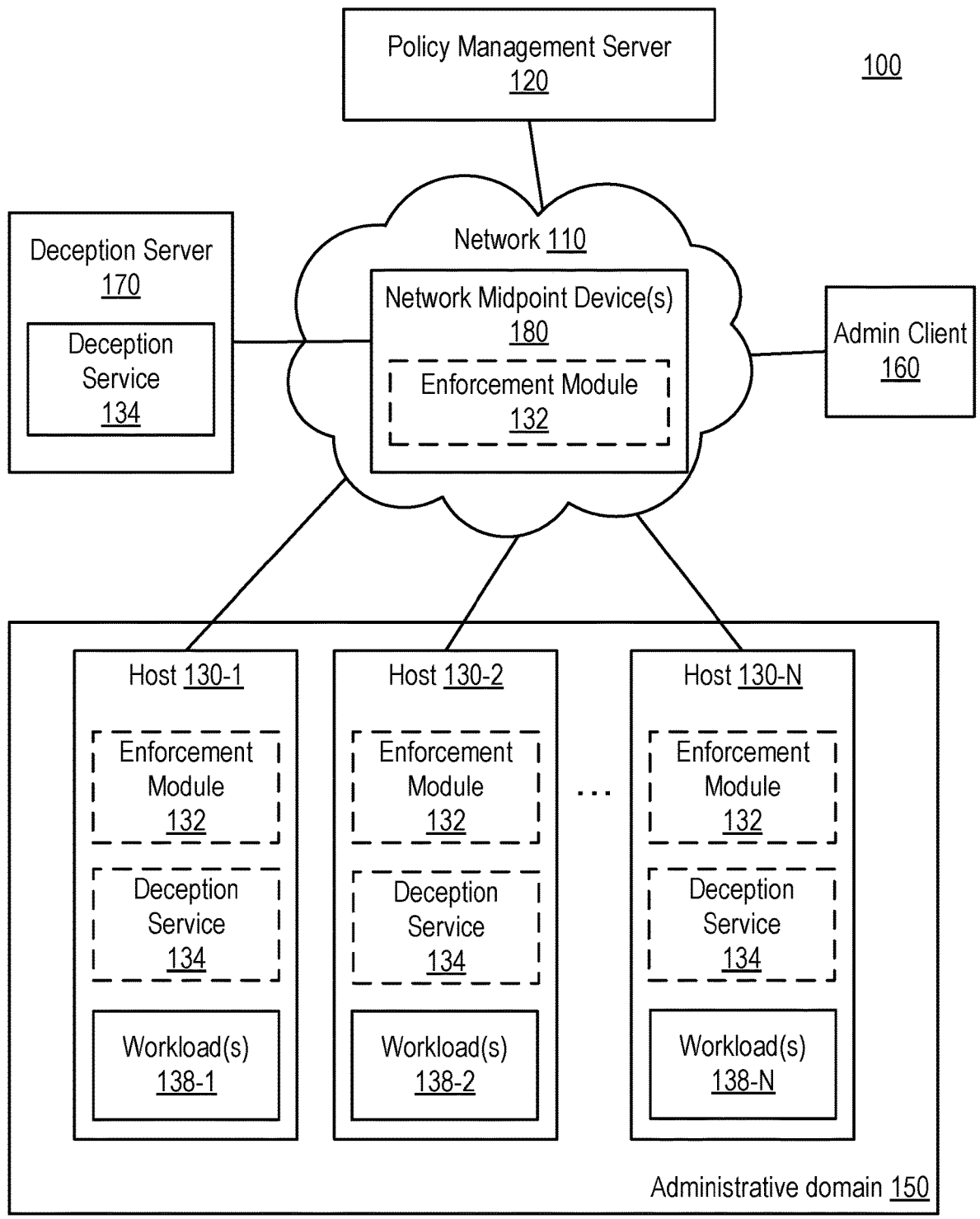
FIG. 1 is a high-level block diagram illustrating an environment for managing a segmentation policy and a deception policy, according to one embodiment.

FIG. 1 is a high-level block diagram illustrating a networked computing environment 100. The networked computing environment 100 includes a policy management server 120, a network 110 including one or more network midpoint devices 180, an administrative client 160, a deception server 170, and an administrative domain 150 that includes a plurality of hosts 130 (e.g., hosts 130-1, 130-2, . . . , 130-N). The administrative domain 150 can correspond to a set of devices controlled by an enterprise such as, for example, a service provider, a corporation, a university, or a government agency.

The hosts 130 may each comprise a physical host device, a virtual machine executing on computer system, or an operating system instance executing on a physical host device or virtual machine capable of hosting one or more workloads 138. A single physical or virtual machine may operate a single host 130 or may operate multiple hosts 130. The hosts 130 each execute one or more workloads 138 (e.g., one or more workloads 138-1, one or more workloads 138-2, etc.). The workloads 138 comprise independently addressable computing units for performing computing tasks. For example, each workload 138 may be addressable on the network 110 by a specific network address associated with the host 130 and a port associated with a service provided by the workload 138. A workload 138 may comprise, for example, an application or application component, a process, a container, or other sub-component thereof executing on the host 130. In some instances, a host 130 may operate only a single workload 138. In other instances, a host 130 may operate multiple workloads 138 (e.g., multiple containers) that may be independently addressable and may execute different applications or otherwise perform different independent computing functions. In some embodiments, multiple workloads 138 may operate collectively to execute an application. The workloads 138 on the hosts 130 may communicate with other workloads 138 on different hosts 130 within the administrative domain 150 to perform various tasks.

The network 110 represents the communication pathways between the policy management server 120, the administrative client 160, and the hosts 130. In one embodiment, the network 110 uses standard communications technologies and/or protocols and can include the Internet. In another embodiment, the entities on the network 110 can use custom and/or dedicated data communications technologies. The network 110 includes one or more network midpoint devices 180 that facilitate communications over the network 110. The network midpoint devices 180 may include, for example, routers, switches, access points, firewall devices, or other devices that control communications between the workloads 138 over the network 110.

The policy management server 120 is an application executing on a host or computer (or set of computers) that obtains and stores information about the hosts 130 on the network 110, the network midpoint devices 180, and the workloads 138 executing on the hosts 130. The policy management server 120 manages a segmentation policy for the administrative domain 150 that regulates communications between workloads 138 within the administrative domain 150. In an embodiment, the segmentation policy is set forth using permissive rules that specify connections that are permitted. The segmentation policy is enforced by blocking connections that are not expressly permitted by the rules. For example, the segmentation policy includes a set of rules specifying whether certain workloads 138 are allowed to provide services to or receive services from other workloads 138, and may place restrictions on how those workloads 138 are allowed to communicate when providing or consuming the services. For example, a segmentation policy may include a rule specifying that a workload 138-1 operating on a host 130-1 is allowed to provide a particular service to a workload 138-2 operating on a host 130-2. Absent other rules, the workload 138-1 will thus be blocked from providing the service to a workload 138-N operating on a host 130-N. The rule may furthermore specify the type of service that the workload 138-1 is allowed to provide to workload 138-2 (e.g., a database service, a web service, etc.). Additionally, the rule may specify how the workloads 138-1, 138-2 may communicate when providing this service (e.g., using encrypted communication only, using authenticated communication only, etc.). A rule may be specified as a plurality of fields including a "service," a "provided-by" portion that identifies one or more workloads 138 that is permitted to provide the service (which may be specified by a port number), a "used-by" portion that identifies one or more workloads 138 that is permitted to use the service provided by the workloads 138 in the "provided-by portion," and a "rule function" that may place one or more restrictions on the communications between the workloads 138 while facilitating the service.

In an embodiment, the policy management server 120 may assign one or more labels to each workload 138 that define one or more high-level characteristics of the workload 138. Labels may be multi-dimensional. Here, a label may comprise a "dimension" (a high-level characteristic) and a "value" (the value of that high-level characteristic). For example, one possible label dimension may specify a "role" of the workload 138 and may have values such as "web," "API," or "database" specifying the role of the workload 138 within the administrative domain 150. In another example, a label dimension may specify a "location" of the workload 138 and may have values such as "United States" or "Europe." Workloads 138 may also be labeled based on a user group of a user that is logged into the workload 138 or the corresponding host 130 on which the workload 138 executes. For example, a workload 138 may have a label with a dimension "user group" and a value "managers." Each workload 138 may be assigned labels for one or more dimensions but each workload 138 does not necessarily have a label assigned for every possible dimension. For example, a workload 138 may have a label specifying its location but may not necessarily have a label specifying its role. The set of labels assigned to a particular workload 138 may be referred to herein as a label set for the workload 138.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
| --- | --- |
| Role | M: The role of the workload within the administrative domain.<br>V: web, API, database |
| Environment | M: The lifecycle stage of the workload.<br>V: production, staging, development |
| Application | M: The logical application (higher-level grouping of managed servers) to which the workload belongs.<br>V: trading, human resources |
| Line of Business | M: The business unit to which the workload belongs.<br>V: marketing, engineering |
| Location | M: The location of the workload. Can be physical (e.g., country or geographical region) or logical (e.g., network). Physical is particularly useful for expressing geographic compliance requirements.<br>V: US or EU (physical), us-west-1 or us-east-2 (logical) |
| User Group | M: The user group containing the user logged onto the workload.<br>V: Engineers, Contractors, Managers, System Administrators |

The policy management server 120 may utilize label sets to enable the segmentation policy to be defined at a high level of abstraction by specifying rules based on label sets. Thus, a rule of the segmentation policy may identify a group of workloads 138 to which a portion of the rule is applicable by referencing one or more label sets. For example, a rule may specify that a first group of workloads 138 with a label set A may provide a service B to a second group of workloads 138 with a label set C. Rules may be specified for groups of workloads 138 identified using only a subset of the label dimensions.

The policy management server 120 may retain a repository storing information about the hosts 130 and the workloads 138 managed by the policy management server 120. For example, the policy management server 120 may store workload identifiers that identify the workloads 138, and membership information indicating one or more groups of workloads 138 to which each workload 138 belong (e.g., as defined by the respective label sets for the workloads 138).

Table 2 illustrates an example of information stored by the policy management server 120. Here, the workload IDs represent the workload identifiers for the workloads 138. The memberships represent groups to which one or more workloads 138 belongs. Each group may correspond to a unique label set involving one or more dimensions.

TABLE 2

Example of a Repository Table

| Workload ID | Memberships |
|---|---|
| ID1 | A, C, D |
| ID2 | B, C |
|  | D |
| . | . |
| . | . |
| . | . |
| IDn | B, D, E, F |

Instead of enforcing the segmentation policy at a centralized device, the segmentation policy is instead enforced in a distributed manner by at least a subset of the hosts 130 and/or the network midpoint devices 180. To enable enforcement of the segmentation policy, the policy management server 120 generates a set of management instructions and distributes the management instructions to enforcement modules 132 that may be executed on the hosts 130 or on the network midpoint devices 180. The management instructions include the rules controlling communications between different groups of workloads 138 (e.g., specified by their label sets or directly by an identifier of the workload 138) and membership information indicating workloads 138 belonging to each group (e.g., which workloads 138 have certain label sets). For efficiency of distribution, the policy management server 120 may send different management instructions to different enforcement modules 132 so that each enforcement module 132 gets only the management instructions relevant to its operation. Here, the policy management server 120 may determine which rules are relevant to a given enforcement module 132 and distribute the relevant rules to that enforcement module 132. A rule may be deemed relevant to an enforcement module 132 on a particular host 130 if that host 130 executes one or more workloads 138 that belongs to a group (defined by one or more label sets) referenced by the rule and the enforcement module 132 on the host 130 is configured to enforce that particular rule. A rule may be deemed relevant to an enforcement module 132 on a particular network midpoint device 180 if that network midpoint device 180 is upstream from a host 130 executing one or more workloads 138 that belongs to a group (defined by one or more label sets) referenced by the rule and the enforcement module 132 on the network midpoint device 180 is configured to enforce that particular rule. The policy management server 120 may furthermore determine which membership information is relevant to each enforcement module 132 and distribute the relevant membership information to each respective enforcement module 132. Here, membership information may be relevant to a particular enforcement module 132 if it defines membership of a group referenced by a rule deemed relevant to the particular enforcement module 132.

The policy management server 120 may furthermore control a deception policy comprising a set of deception rules. The deception rules control a distribution of deception services 134 that may execute on devices coupled to the network 110 (e.g., on hosts 130 or on a dedicated deception server 170). Each deception service 134 may perform actions that mimic behaviors of real services provided by workload 138 so that a malicious actor may not be able to determine whether it is connected to a workload 138 providing a real service or a deception service 134. If a device connects to a deception service 134, the deception service 134 can facilitate communications with the connected device to enable the deception service 134 to obtain and log information useful for identifying if the connected device is a malicious actor. If a malicious actor is identified the policy management server 120 may take an action to protect the affected workloads 138, such as removing rules that enable connections to the malicious actor. If the malicious actor is within the direct control of the policy management server 120, the policy management server may additionally or alternatively quarantine or remove the malicious actor. Deception services 134 may be implemented on a dedicated deception server 170 that does not host workloads 138 providing real services, and/or may be implemented on hosts 130 that concurrently host one or more workloads 138. For example, a host 130 may execute one or more workloads 138 that are accessible over one or more specific network ports and may implement deception services 134 on one or more other ports not associated with the workloads 138. A malicious actor attempting to connect to a workload 138 on a host 130 without specific knowledge of the network address or network port associated with the workload 138 may perform a network address scan and/or port scan and inadvertently connect to a deception service 134. The deception service 134 can then gain information about the malicious actor and facilitate a remedial action to quarantine or disable the malicious actor. In other instances, the deception policy may cause connection requests to a port hosting a real workload 138 to be redirected to a deception service 134 if the requestor is detected as potentially being a malicious actor.

The rules pertaining to deceptions services may be configured as label-based rules and distributed to enforcement modules 132 according to the label sets specified in the deception rules. For example, a rule may instruct an enforcement module 132 association with one or more workloads 138 having a specified label set to apply a deception service 134 on a particular set of ports. Alternatively, a deception rule may instantiate or enable a deception service 134 on a dedicated deception server 170 that may be identified by a label set. By deploying deception services 134 in a distributed manner, such services may be efficiently deployed throughout a substantial number of hosts 130 based on the labels of their respective workloads 138 without requiring an administrator to independently configure deception services 134 on each individual host 130. Furthermore, if labels assigned to workloads 138 are updated or if the deception rules are updated, the deceptions services 134 may be automatically deployed or removed consistent with the updated labels and deception policy in an efficient manner that does not require manually updates. Further still, by employing deception services 134 in a widespread distributed manner (e.g., on significant numbers of network addresses and ports not hosting workloads 138), a malicious actor will face a significant challenge in carrying out an attack because it cannot easily distinguish between real services on workloads 138 and deception services 134 that will act to neutralize the threat.

In an embodiment, the enforcement modules 132 may store logs of traffic flow data indicating traffic that is blocked by a traffic filter and traffic that is allowed to pass through the traffic filter. The enforcement modules 132 may report respective traffic flow data to the policy management server 120. This traffic flow data may be appropriately labeled to enable the policy management server 120 to identify traffic flow data associated with different workloads 138 and associated with deception services 134. The policy management server 120 may analyze the traffic flow data to generate a graphical representation of connections being allowed and connections being blocked to enable a network administrator to visualize the permitted and blocked connections. Furthermore, the policy management server 120 can analyze the traffic flow data to identify a malicious actor based on information obtained from one or more deception services 134 with which the malicious actor connects. The policy management server 120 may update the segmentation policy or take a different remedial action (e.g., alerting an administrator) based on the analyzed traffic flow data (e.g., to quarantine a suspected malicious actor).

The administrative client 160 comprises a computing device that may be operated by an administrator of the administrative domain 150 being managed by the policy management server 120. The administrative client 160 may execute an interface (e.g., via an application or web browser) that enables the administrator to interact with the policy management server 120 to configure or view the segmentation policy. The interface may furthermore enable the administrator to obtain various information about the hosts 130 and workloads 138 on the network 120 and view traffic flows between the workloads 138 as described above.

The deception server 170 may comprise a physical server, virtual machine, container, or process running as a service on a host 130 that provides a deception service 134 associated with one or more network addresses and ports. In alternative embodiments, the network environment 100 may include multiple deception servers 170. In other alternative embodiments, the deception server 170 may be omitted and the deception services 134 may instead operate solely on the hosts 130.

Figure 2:
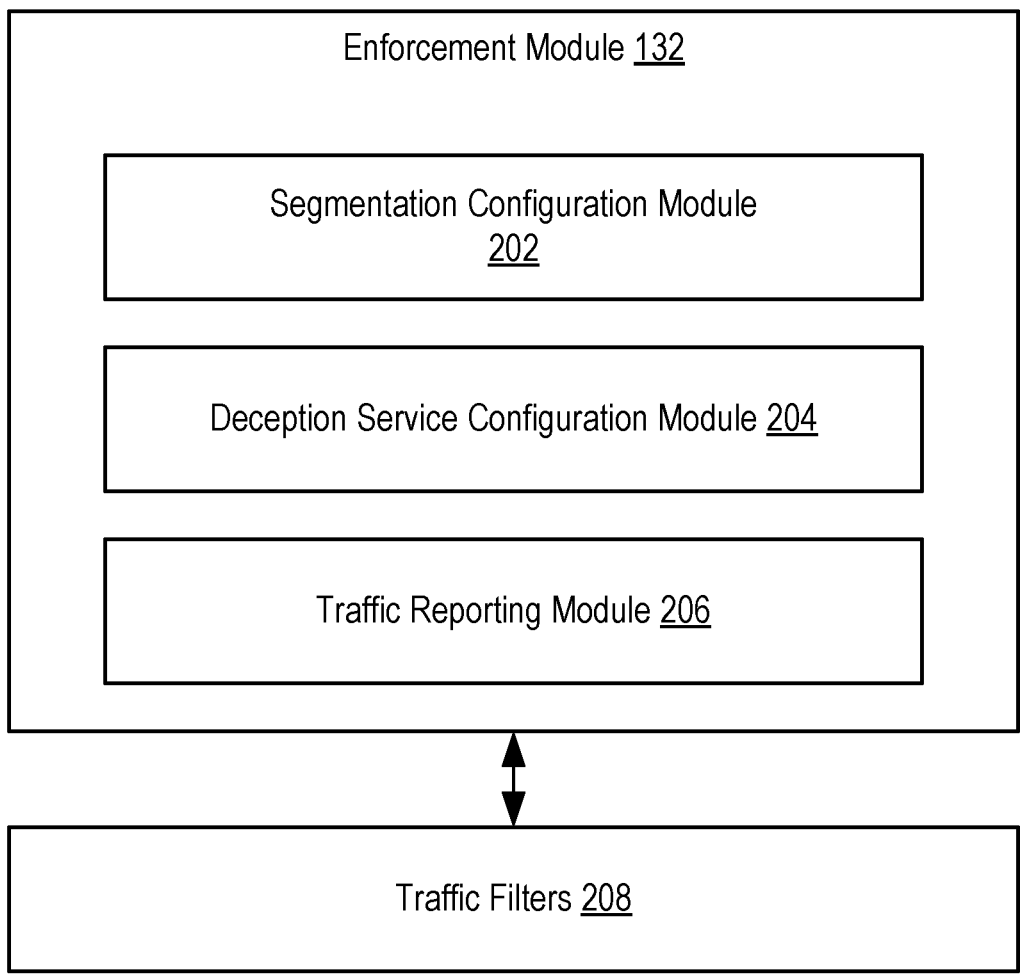
FIG. 2 is a block diagram illustrating an example embodiment of an enforcement module.

FIG. 2 illustrates an example embodiment of an enforcement module 132. The enforcement module 132 comprises a segmentation configuration module 202, a deception service configuration module 204, and a traffic reporting module 206 that may each interact with one or more traffic filters 208. In alternative embodiments, the enforcement module 132 may include different or additional modules. The various components of the enforcement module 132 may be implemented as one or more processors and a non-transitory computer-readable storage medium that stores instructions executed by the one or more processors to carry out the functions attributed to the enforcement module 132 described herein.

The traffic filters 208 operates to enforce the segmentation policy with respect to a workload 138 executing on a host 130 and to enforce any associated deception policy. To enforce the segmentation policy, the traffic filters 208 may apply a set of packet filtering rules that block or allow communications to a particular workload based on specific criteria associated with the communications such as the source and destination network addresses and ports, protocols associated with the communication, and a connection state. In an embodiment, the segmentation rules applied by the traffic filters 208 are generally permissive rules (e.g., a white list) that specify which specific communications are permitted. A default rule may cause the traffic filters 208 to block communications (e.g., drop packets) that do not match any of the permissive rules.

To enforce the deception policy, the traffic filters 208 may directly implement a deception service 134 or may forward traffic to an external deception service 134 executing on a dedicated deception server 170 or a different host 130. For example, the traffic filters 208 may execute deception services 134 on one or more ports not associated with a real workload 138 or may forward traffic to these ports to an external deception service 134. Furthermore, the traffic filters 208 may be configured to redirect traffic intended for a port hosting a real workload 138 to a deception service 134 if the source of the request is suspected of being a malicious actor. The traffic filters 208 may furthermore execute rules to log results of applying the filters to make the traffic flow data accessible to the enforcement module 132.

In an embodiment, the traffic filters 208 may comprise an operating system-level firewall such as a Linux kernel firewall based on iptables or Netfilter modules or a Windows firewall based on a Windows Filtering Platform. Furthermore, the traffic filters 208 may comprise an Internet Protocol security (IPsec) engine that controls encryption and decryption of packets.

The segmentation configuration module 202 receives management instructions from the policy management server 120 and translates the management instructions from a high level of abstraction to a low level of abstraction to configure the traffic filters 208 based on the segmentation policy. For example, for a given rule that permits communication between a workload 138 managed by the enforcement module 132 and a group of other workloads 138 having a specified label set, the segmentation configuration module 202 determines workload identifiers for each of the workloads 138 having the specified label set, and configures the traffic filters 208 to permit communications with the identified workloads 138 in accordance with any restrictions (e.g., ports and protocols) specified in the given rule.

The deception service configuration module 204 receives deception rules from the policy management server 120 and configures the traffic filters 208 to facilitate the deception services 134. In an embodiment, the deception configuration module 204 configures the traffic filters 208 to directly implement the deception service 134. Here, the deception configuration module 204 may configure the traffic filters 208 to automatically acknowledge a connection request on one or more ports designated for the deception service 134 and then monitor and log further communications from the connected device. Alternatively, the traffic filters 208 may be configured to take different actions at different probabilities to better simulate behavior of a real workload 138. For example, the traffic filters 208 may be configured to send a message indicating that the target is unreachable for a small percentage of requests (e.g., 1%), or otherwise accepts or drops the connection at different percentages. In other embodiments, the traffic filters 208 may be configured to send a delayed response for some percentage of requests. In another embodiment, the deception configuration module 204 configures the traffic filters 208 to operate as a proxy by forwarding traffic on one or more specified ports to an external deception service 134 executing on a difference host 130 or on the deception server 170, and to forward return traffic from the external deception service 134 to the connecting device.

The traffic reporting module 206 obtains traffic flow data from the traffic filters 208 indicating communications that pass through the filters 208 and communications that are blocked by the filters 208. For example, the traffic flow data may indicate the source network address and port, the destination network address and port, the protocol associated with the communication, whether the communication as allowed or blocked (and according to what rule), a connection state, or other identifying information. The traffic reporting module 206 may then report the traffic flow data to the policy management server 120. In an embodiment, the traffic reporting module 206 may aggregate or filter the traffic flow data prior to reporting to the policy management server 120. Alternatively, the traffic reporting module 206 may report the raw traffic flow data to the policy management server 120.

Figure 3:
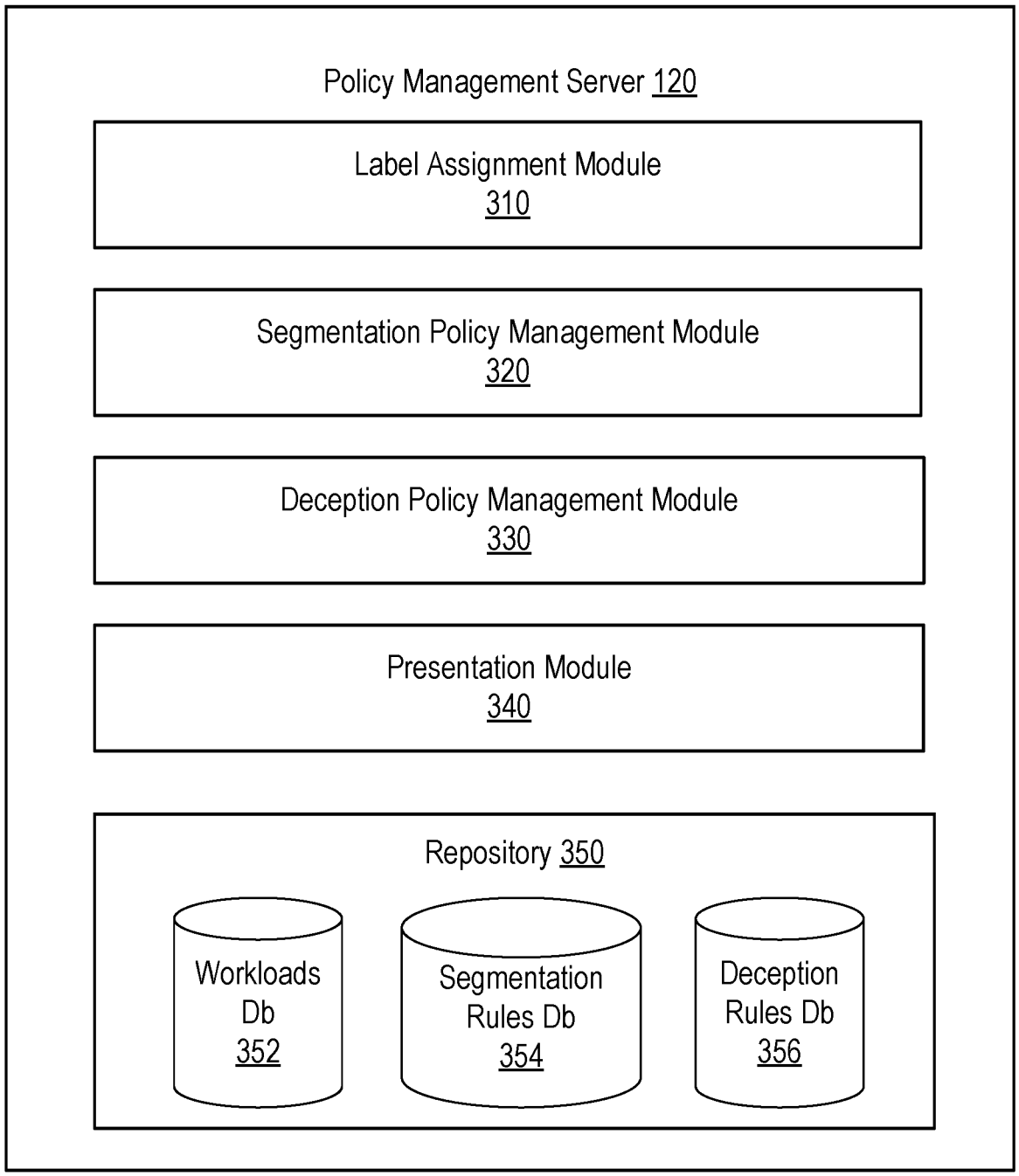
FIG. 3 is a block diagram illustrating an example embodiment of a policy management server.

FIG. 3 is a high-level block diagram of an embodiment of a policy management server 120. The policy management server 120 comprises a label assignment module 310, a segmentation policy management module 320, a deception policy management module 330, a presentation module 340, and a repository 350. The repository 350 may comprise a workloads database 352 that stores associations between workloads 138 and their respective label sets, a segmentation rules database 354 that stores a segmentation policy as a set of rules, and a deception rules database 356 that stores a deception policy as a set of deception rules. In alternative embodiments, the policy management server 120 may include different or additional components. The various components of the policy management server 120 may be implemented as one or more processors and a non-transitory computer-readable storage medium that stores instructions executed by the one or more processors to carry out the functions attributed to the policy management server 120 described herein.

The label assignment module 310 facilitates assignment of labels to workloads 138. For example, the label assignment module 310 may assign labels based on a set of configurable label assignment rules that may be managed by an administrator via the administrative client 160. Alternatively, labels for individual workload 138 may be manually assigned by an administrator. Labels may be updated dynamically based on changing characteristics of workloads 138.

The segmentation policy management module 320 manages configuring and updating of a segmentation policy comprising a set of segmentation rules. The segmentation rules may be manually configured by a system administrator or may be generated automatically based on various predefined segmentation. Once configured, the segmentation policy management module 320 distributes the rules to enforcement modules 132 to enforce the segmentation policy. For example, the segmentation policy management module 320 determines which segmentation rules are relevant to different enforcement modules 132 depending on the labels of the workloads 138 associated with each enforcement module 132 and distributes only relevant rules to each enforcement module 132. Thus, different enforcement modules 132 may receive different subsets of the rules depending on which workloads 138 are associated with them. The segmentation policy management module 320 may dynamically update instructions sent to the enforcement modules 132 in response to changes in the segmentation policy, changes to the labels of workloads 138, changes to the applications executing on the workloads 138, or changes to application information associated with the applications.

The segmentation policy management module 320 may furthermore automatically update a segmentation policy based on observed traffic flow data. For example, the segmentation policy management module 320 may identify behavior indicative of malicious activity and may update the segmentation policy to take a remedial action against a malicious actor (e.g., quarantining the malicious actor).

The deception policy management module 330 manages configuring and updating of a deception policy comprising a set of deception rules. The deception rules may be manually configured by a system administrator or may be generated automatically based on various predefined deception strategies. For example, a deception strategy may configure the deception policy in conjunction with the segmentation policy by automatically generating deception rules that invoke deception services in responses to all connection requests (or a subset thereof) that are not allowed by the segmentation policy. Once configured, the deception policy management module 330 distributes the rules to enforcement modules 132 or to a deception server 170 to enforce the deception policy. For example, the deception policy management module 330 determines which deception rules are relevant to different enforcement modules 132 depending on the labels of the workloads 138 associated with each enforcement module 132 and distributes only relevant deception rules to each enforcement module 132. Thus, different enforcement modules 132 may receive different subsets of the deception rules depending on which workloads 138 are associated with them. The deception policy management module 330 may dynamically update deception rules sent to the enforcement modules 132 in response to changes in the deception policy, changes to the labels of workloads 138, changes to the applications executing on the workloads 138, or changes to application information associated with the applications.

The presentation module 340 interfaces with the administrative client 160 to present a user interface enabling an administrator to view a representation of the traffic flows, and to view, create, or modify rules associated with the segmentation policy or deception policy. For example, the presentation module 360 may generate a graphical interface representing all or a portion of the traffic flow graph with the workloads 138 or deception services 134 illustrated as nodes and the traffic flows to and from the workload 138 or deception services 134 illustrated as edges connecting relevant nodes. An administrator may similarly select an edge on the graph to view information about the corresponding traffic flow such as, for example, services associated with the traffic flow, ports and protocols associated with the traffic flow, or statistical information associated with the traffic flow. The traffic flow graph may provide visual indicators to indicate any workloads 138 and associated connections that have been identified as potentially malicious to enable an administrator to take remedial action. If actions are taken automatically by the segmentation policy management module 320 against a detected malicious actor, a representation of this action (e.g., blocked connections) may also be indicated in the traffic flow graph to enable an administrator to easily view the detection.

Figure 4:
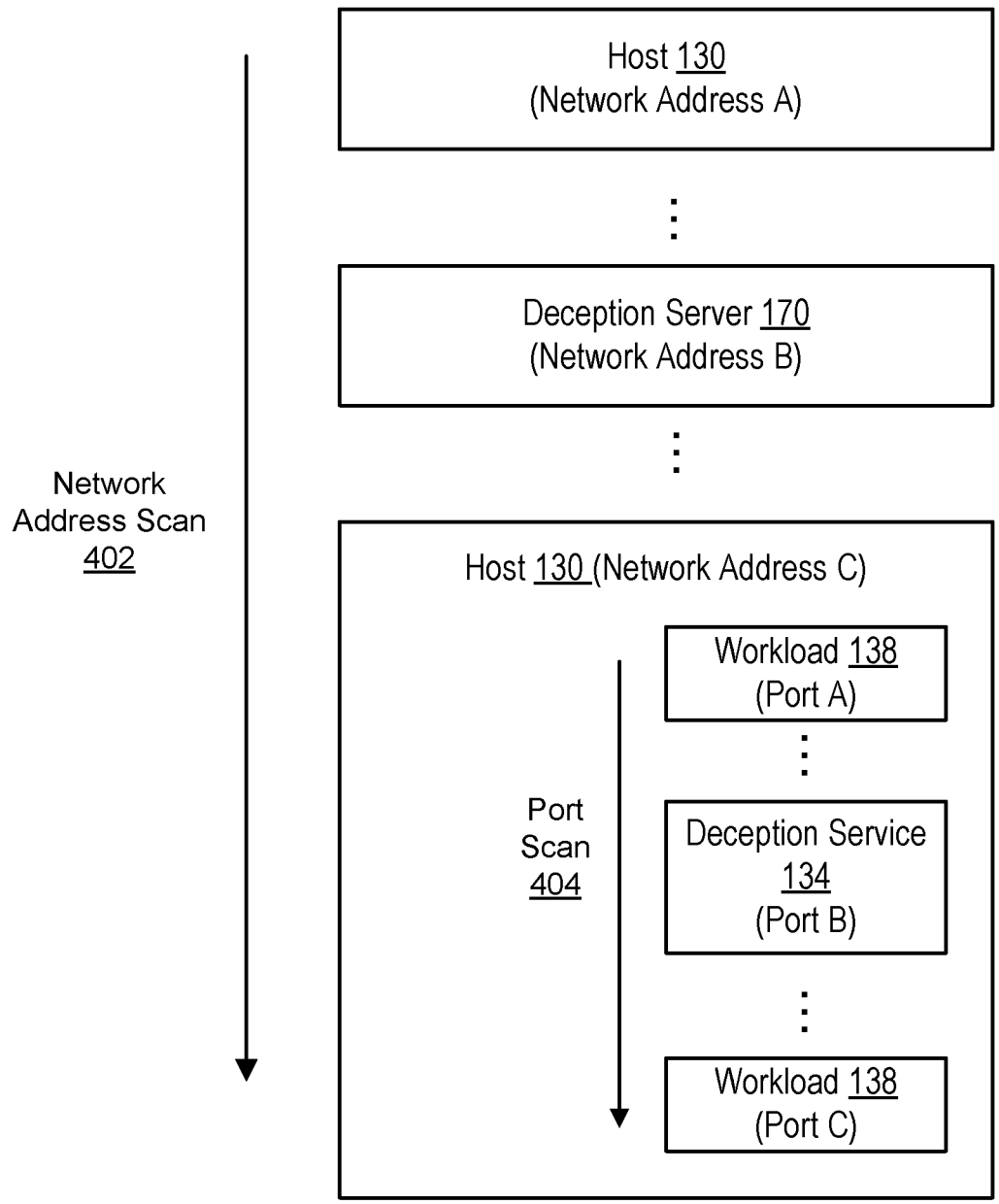
FIG. 4 is a block diagram examples of attack patterns that can be guarded against using deception techniques.

FIG. 4 is a diagram illustrating examples of traffic patterns that are commonly employed by a malicious actor that can be detected and remediated using the deceptions services 134. As illustrated, a malicious actor may perform a network address scan 402 in which it attempts connections on one or more specific ports over a range of network addresses (e.g., IP addresses) until it receives a response to the connection request. In the present implementation, a deception server 170 may operate on one or a plurality of network addresses so that a malicious actor making a connection may not be able to determine whether it connected to a deception server 170 or a host 130 hosting a real workload 138. If the malicious actor connects to the deception server 170, the deception server 170 can gather information about the malicious actor to enable it to be detected and remediated. If a significantly larger number of network addresses are associated with deception servers 170 than hosts 130 of workloads 138 providing real services, then it is significantly more likely that the malicious actor will connect to a deception server 170 first, thereby enabling protection of the workloads 138.

In other cases, a malicious actor may attempt to connect to a network address of a host 130 and may execute a port scan to attempt to find an open port hosting a real workload 138. By executing deception services 134 on one or more ports, the malicious actor may connect to the deception service 134 before it finds a workload 138 hosting a real service, thereby enabling detection of the malicious actor. If a significantly larger number of ports are associated with deception services 170 than workloads 138 providing real services, then it is significantly more likely that the malicious actor will connect to the deception service 134 first. In some embodiments, a deception policy may cause deception services 134 to execute on ports that are generally expected to be used for real services (and may instead put those real services on different ports) to further increase the likelihood of the malicious actor connecting to the deception service 134 and being detected before it can connect to a workload 138 hosting real services.

In other example cases, a source of a connection request that is not allowed by the segmentation policy to make the requested connection may be automatically connected to a deception service by the deception rules. Under this deception strategy, an allowed source may always connect to a real workload 138 and non-allowed sources are always connected to deception services.

Figure 5:
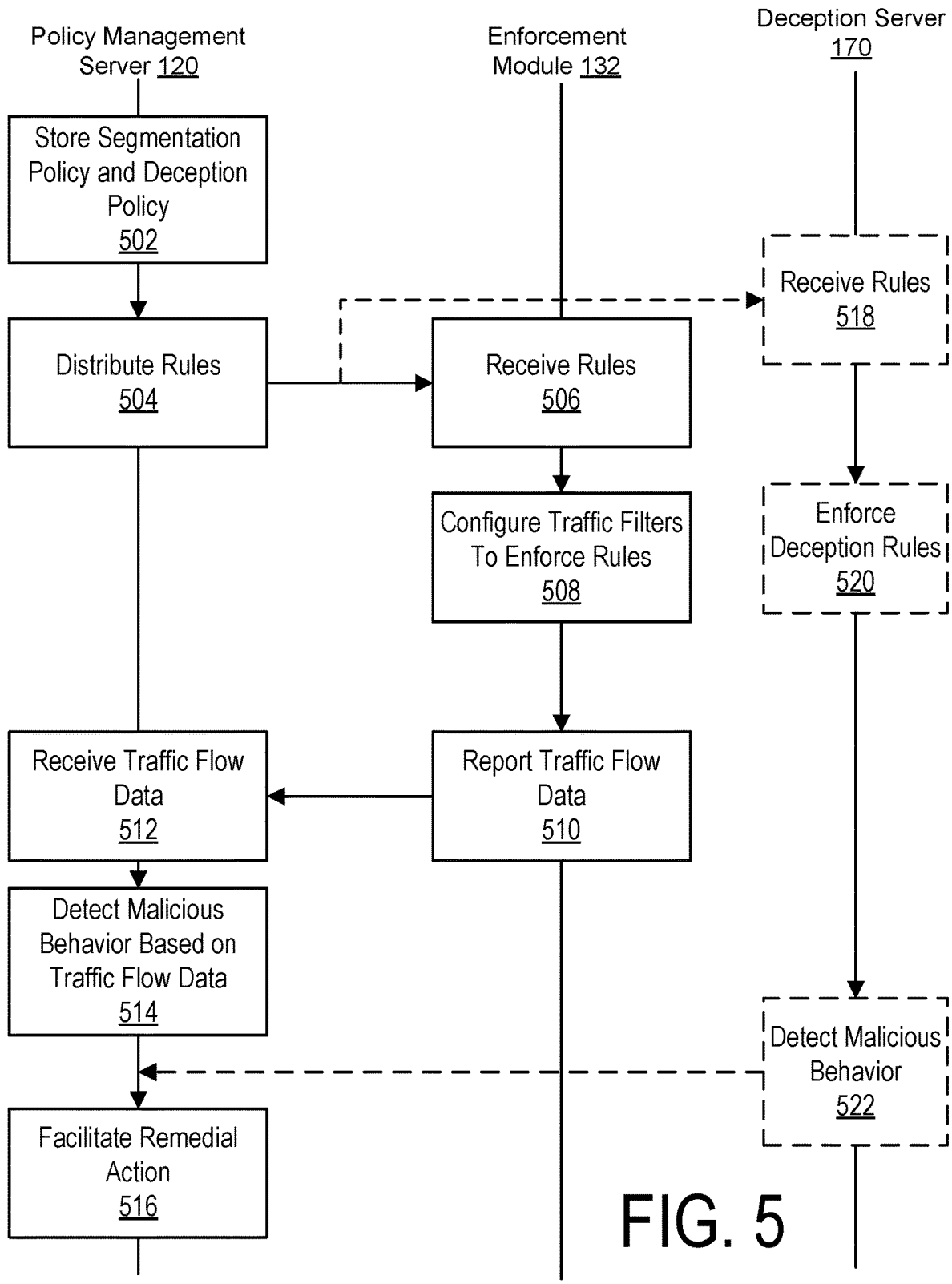
FIG. 5 is a flowchart illustrating an example embodiment of a process for implementing a deception technique in a segmented network to detect and remediate malicious activity.

FIG. 5 illustrates an embodiment of a process for facilitating deception services 134 in a segmented network environment. A policy management server 120 stores 502 the segmentation policy as a set of segmentation rules and the deception policy as a set of deception rules. The policy management server 120 distributes 504 the rules to one or more enforcement modules 132. The enforcement module 132 receives 506 the rules and configures 508 traffic filters to enforce the rules. Here, the enforcement module 132 may enforce the segmentation rules by configuring the traffic filters to allow communications meeting specified criteria (e.g., a specified source network address and port, a specified destination network address and port, a specified protocol, etc.) while blocking other communications. The enforcement module 132 may enforce deception rules by configuring the traffic filters to respond to communications meeting specified criteria without forwarding the communications to the workloads 138. The enforcement module 132 then reports 510 traffic flow data associated with the configured traffic filters to the policy management server 120. The policy management server receives 512 the traffic flow data and analyzes the traffic flow data to detect 514 malicious behavior.

If malicious behavior is detected, the policy management server 120 may facilitate 516 a remedial action. The remedial action may comprise, for example, marking communications associated with the malicious activity in a traffic flow graph, alerting an administrator to the malicious activity, updating the segmentation policy to quarantine the malicious actor, revoking privileges associated with the malicious actor, or other remedial steps to protect the workloads 138 from the malicious activity.

In another embodiment, the policy management server 120 may additionally distribute deception rules directly to one or more deception servers 170. The deception server 170 receives 518 the rules and enforces 520 the rules to carry out deception services 134 on network addresses separate from the hosts 130. Here, the deception server 170 may detect 522 malicious behavior through the deception service and report this information to the policy management server 120.

In yet another embodiment, the enforcement module 132 may enforce the deception rules by configuring the traffic filters to forward communications to the remote deception service (e.g., executing on a deception server 170), and to forward communications from the remote deception service back to the source device, thus enabling the enforcement module 132 to operate as a proxy. In this case, the enforcement module 132 may provide the traffic flow data to the policy management server 120 to enable the policy management server 120 to detect malicious behavior, or malicious behavior may be directly detected 522 by the deception server 170 and reported to the policy management server 120.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for protecting services in a segmented network environment using deception, the method comprising:
    storing at a policy management server, a segmentation rule that allows communications meeting first criteria between at least a first group of workloads and a second group of workloads;
    storing, at the policy management server, a deception rule for implementing a deception service with respect to communications meeting second criteria;
    distributing the segmentation rule and the deception rule to an enforcement module executing on a remote device and associated with at least one workload of the first group of workloads to cause the enforcement module to configure a traffic filter to allow the communications meeting the first criteria of the segmentation rule and to facilitate a deception service in response to communications meeting the second criteria of the deception rule;
    receiving from the workload, traffic flow data associated with communications meeting the second criteria of the deception rule;
    detecting if the traffic flow data is indicative of malicious behavior; and
    performing a remedial action in response to detecting the traffic flow data is indicative of the malicious behavior.

2. The method of claim 1, wherein distributing the deception rule to the enforcement module comprises:
    causing the enforcement module to configure the traffic filter with a filtering rule to send an acknowledgement message in response to a connection request meeting the second criteria of the deception rule and to log communications associated with the connection request.

3. The method of claim 1, wherein distributing the deception rule to the enforcement module comprises:
    causing the enforcement module to configure the traffic filter with a filtering rule to randomly select and perform one of the following actions according to predefined probabilities:
        send an acknowledgement message in response to a connection request;
        sending a delayed response to the connection request;
        dropping the connection request without sending a response.

4. The method of claim 1, wherein distributing the deception rule to the enforcement module comprises:
    causing the enforcement module to configure the traffic filter with a filtering rule to forward a connection request meeting the second criteria of the deception rule to a deception server to execute a deception service using the host device as a proxy.

5. The method of claim 1, wherein distributing the deception rule comprises:
    providing the deception rule to a deception server at a network address different from network addresses of any of the first or second groups of workloads.

6. The method of claim 1, wherein the deception rule instructs the enforcement module to facilitate the deception service in response to the communications comprising a connection request on one or more specified ports of one or more network addresses.

7. The method of claim 1, further comprising:
    automatically generating a deception policy that includes the deception rule based on a segmentation policy that includes the segmentation rule, wherein automatically generating the deception policy comprises generating a set of deception rules that cause connection requests that are not allowed by the segmentation policy to be handled by the deception service.

8. A method for protecting services in a segmented network environment using deception, the method comprising:
    receiving by an enforcement module of a host device, a segmentation rule for allowing communications meeting first criteria between a local workload associated with the enforcement module and one or more remote workloads;
    receiving, by the enforcement module, a deception rule for implementing a deception service in association with communications that meet second criteria;
    configuring a traffic filter of the host device to enforce the segmentation rule and the deception rule; and
    receiving a connection request that meets the second criteria of the deception rule;
    applying rules of the traffic filter to establish a connection responsive to the connection request and to facilitate a deception service with respect to the connection;
    monitoring and logging traffic flow data associated with the connection; and
    sending the traffic flow data to the policy management server.

9. The method of claim 8, wherein applying the traffic filter comprises:
    executing a filtering rule to send an acknowledgement message in response to the connection request and to log communications associated with the connection.

10. The method of claim 8, wherein applying the traffic filter comprises:
    executing a filtering rule to forward the connection request to a deception server to execute a deception service using the host device as a proxy.

11. The method of claim 8, wherein the set of segmentation rules that allow communications meeting first criteria comprises at least a first rule comprising a specified label set, a specified port, and a specified protocol, where the first rule allows first communications from a first remote workload that has the specified label set and that are communicated over the specified port and the specified protocol.

12. The method of claim 8, wherein the communications that meet the second criteria comprise communications targeted to a different port of the host device than a port hosting the local workload.

13. The method of claim 8, facilitating the deception service comprises:
   facilitating communication over the connection to obtain information about a remote workload making the connection request;
   processing the information to identify the remote workload as malicious; and
   sending to the policy management server, an indication that the remote workload is malicious.

14. A non-transitory computer-readable storage medium storing instructions for protecting services in a segmented network environment using deception, the instructions when executed by a processor causing the processor to perform steps including:
   storing at a policy management server, a segmentation rule that allows communications meeting first criteria between at least a first group of workloads and a second group of workloads;
   storing, at the policy management server, a deception rule for implementing a deception service with respect to communications meeting second criteria;
   distributing the segmentation rule and the deception rule to an enforcement module executing on a remote device and associated with at least one workload of the first group of workloads to cause the enforcement module to configure a traffic filter to allow the communications meeting the first criteria of the segmentation rule and to facilitate a deception service in response to communications meeting the second criteria of the deception rule;
   receiving from the workload, traffic flow data associated with communications meeting the second criteria of the deception rule;
   detecting if the traffic flow data is indicative of malicious behavior; and
   performing a remedial action in response to detecting the traffic flow data is indicative of the malicious behavior.

15. The non-transitory computer-readable storage medium of claim 14, wherein distributing the deception rule to the enforcement module comprises:
   causing the enforcement module to configure the traffic filter with a filtering rule to send an acknowledgement message in response to a connection request meeting the second criteria of the deception rule and to log communications associated with the connection request.

16. The non-transitory computer-readable storage medium of claim 14, wherein distributing the deception rule to the enforcement module comprises:
   causing the enforcement module to configure the traffic filter with a filtering rule to randomly select and perform one of the following actions according to predefined probabilities:
     send an acknowledgement message in response to a connection request;
     sending a delayed response to the connection request;
     dropping the connection request without sending a response.

17. The non-transitory computer-readable storage medium of claim 14, wherein distributing the deception rule to the enforcement module comprises:
   causing the enforcement module to configure the traffic filter with a filtering rule to forward a connection request meeting the second criteria of the deception rule to a deception server to execute a deception service using the host device as a proxy.

18. The non-transitory computer-readable storage medium of claim 14, wherein distributing the deception rule comprises:
   providing the deception rule to a deception server at a network address different from network addresses of any of the first or second groups of workloads.

19. A non-transitory computer-readable storage medium storing instructions for protecting services in a segmented network environment using deception, the instructions when executed by a processor causing the processor to perform steps comprising:
   receiving by an enforcement module of a host device, a segmentation rule for allowing communications meeting first criteria between a local workload associated with the enforcement module and one or more remote workloads;
   receiving, by the enforcement module, a deception rule for implementing a deception service in association with communications that meet second criteria;
   configuring a traffic filter of the host device to enforce the segmentation rule and the deception rule; and
   receiving a connection request that meets the second criteria of the deception rule;
   applying rules of the traffic filter to establish a connection responsive to the connection request and to facilitate a deception service with respect to the connection;
   monitoring and logging traffic flow data associated with the connection; and
   sending the traffic flow to the policy management server.

20. The non-transitory computer-readable storage medium of claim 19, wherein applying the traffic filter comprises:
   executing a filtering rule to send an acknowledgement message in response to the connection request and to log communications associated with the connection.

* * * * *